(12) United States Patent
Reshef

(10) Patent No.: US 9,134,834 B2
(45) Date of Patent: Sep. 15, 2015

(54) WRISTBAND HAVING A USER INTERFACE AND METHOD OF USING THEREOF

(71) Applicant: Made In Sense Limited, Hong Kong (HK)

(72) Inventor: Gilad Reshef, Ma On Shan (HK)

(73) Assignee: Made In Sense Limited, Hong Kong (HK)

( * ) Notice: Subject to any disclaimer, the term of this patent is extended or adjusted under 35 U.S.C. 154(b) by 0 days.

(21) Appl. No.: 13/873,338

(22) Filed: Apr. 30, 2013

(65) Prior Publication Data

US 2013/0293494 A1 Nov. 7, 2013

Related U.S. Application Data

(60) Provisional application No. 61/641,985, filed on May 3, 2012.

(51) Int. Cl.
| | |
|---|---|
| *G06F 1/16* | (2006.01) |
| *G06F 3/041* | (2006.01) |
| *G06F 3/01* | (2006.01) |
| *G06F 3/0354* | (2013.01) |

(52) U.S. Cl.
CPC ............... *G06F 3/041* (2013.01); *G06F 1/163* (2013.01); *G06F 3/016* (2013.01); *G06F 3/03547* (2013.01); *G06F 2203/0339* (2013.01)

(58) Field of Classification Search
CPC ..... G06F 1/163; G06F 3/041; G06F 3/03547; G06F 3/016; G06F 3/0488
USPC .............................. 345/173; 368/13, 282, 255
See application file for complete search history.

(56) References Cited

U.S. PATENT DOCUMENTS

| | | | | |
|---|---|---|---|---|
| 6,359,550 | B1 * | 3/2002 | Brisebois et al. | 340/407.1 |
| 7,209,114 | B2 * | 4/2007 | Radley-Smith | 345/173 |
| 7,307,620 | B2 | 12/2007 | Siddeeq | |
| 7,477,890 | B1 * | 1/2009 | Narayanaswami | 455/414.1 |
| 2009/0059730 | A1 * | 3/2009 | Lyons et al. | 368/69 |
| 2009/0280861 | A1 | 11/2009 | Khan | |
| 2010/0219943 | A1 * | 9/2010 | Vanska et al. | 340/407.1 |
| 2011/0018731 | A1 | 1/2011 | Linsky et al. | |
| 2011/0059769 | A1 * | 3/2011 | Brunolli | 455/556.1 |
| 2011/0157046 | A1 * | 6/2011 | Lee et al. | 345/173 |

(Continued)

FOREIGN PATENT DOCUMENTS

| | | | | |
|---|---|---|---|---|
| CH | | 618827 | A * | 8/1980 |
| WO | WO 2011/089539 | | | 7/2011 |

OTHER PUBLICATIONS

International Search Report for corresponding International Application No. PCT/CN2013/074841, 4 pgs, mailed Aug. 1, 2013.

(Continued)

*Primary Examiner* — Kevin M Nguyen

(57) ABSTRACT

A user input system that includes a wristband sized for at least partly encircling a wearer's wrist and having an outer surface, a touch surface operative to detect at least one movement vector of at least one fingertip which slide contiguously against the outer surface, a touch controller for analyzing the at least one movement vector to identify a computing device operation command, and a wireless communication unit for wirelessly transmitting the computing device operation command to the computing device.

22 Claims, 12 Drawing Sheets

(56) References Cited

U.S. PATENT DOCUMENTS

2012/0218193 A1* 8/2012 Weber et al. .................. 345/173
2012/0330387 A1 12/2012 Ferraz Rigo et al.
2013/0170324 A1* 7/2013 Tu et al. .......................... 368/28
2013/0262298 A1* 10/2013 Morley ......................... 345/173

OTHER PUBLICATIONS

International Search Report Dated Aug. 1, 2013 From The State Intellectual Property Office of the People's Republic of China Re. Application No. PCT/CN2013/074841.

* cited by examiner

WRISTBAND HAVING A USER INTERFACE AND METHOD OF USING THEREOF

FIELD OF THE INVENTION

The present invention, in some embodiments thereof, relates to user interfaces and, more particularly, but not exclusively, to a wristband having a user interface and a method of using thereof.

BACKGROUND OF THE INVENTION

Cellular phones, such as Smartphones, and tablets have become a ubiquitous activity in today's society. Many users require constant access to their Smartphones to maintain their professional or personal lives. For some users, this means that they are tethered to use the input interfaces and alerting of these devices all day long. This requires focusing on the keypad or touchpad of the device.

Various devices have been developed to assist users in their communication with such devices, some of them designed as wristbands. For example U.S. Pat. No. 7,307,620 describes a one-handed thumb-supported mobile input device for a computing device including an input mechanism and a thumb loop or an elastic band in which a thumb of a hand may be inserted. The thumb loop or elastic band is attached to an adjustable thumb loop holder that is enclosed within a thumb loop holder and is adjustable with respect to the thin sections of the input mechanism. The thumb loop holder is attached to one of the sections of the input mechanism. The input mechanism has a folded position and an unfolded position, and includes a number of thin sections containing a number of keys, and which may have one or more folds. The device may further include a display mechanism having a folded position and an unfolded position, and including a thin section containing a display and that is foldable with respect to the sections of the input mechanism.

SUMMARY OF THE INVENTION

According to some embodiments of the present invention there is provided a user input system comprising a wristband structure sized for at least partly encircling a wearer's wrist and having an outer surface, a touch surface operative to detect at least one movement vector of at least one fingertip which slide contiguously against the outer surface, a touch controller adapted to analyze the at least one movement vector to identify a computing device operation command, and a wireless communication unit adapted to wirelessly transmit the computing device operation command to the computing device.

Optionally, the user input system comprises a wristband communication module which is set to be installed in the computing device and to translate the computing device operation command to an application operation applied on an active application executed on the computing device.

Optionally, the wristband communication module is adapted to automatically identify the active application among a plurality of optional applications and to select the application operation accordingly.

Optionally, the wristband communication module is adapted to automatically identify a status of the active application and to select the application operation accordingly.

Optionally, the at least one movement vector includes a plurality of movement vectors and the plurality of movement vectors are generated by at least one fingertip touching said outer surface.

Optionally, the at least one movement vector includes a plurality of movement vectors and the plurality of movement vectors are generated by a plurality of fingertips which slide simultaneously and contiguously against said outer surface.

Optionally, the touch surface encircles at least 10% of the outer surface.

Optionally, the touch surface completely encircles the outer surface.

Optionally, the wristband is sized for encircling at least 40% of the perimeter of the wearer's wrist.

Optionally, the touch surface comprises a plurality of touch sensors positioned below the outer surface.

Optionally, the wireless communication unit is adapted to wirelessly receive a wristband operation command from the computing device. The system further comprises a plurality of vibrating elements and a controller which is adapted to operate the plurality of vibrating elements according to the wristband operation command.

More optionally, the controller is adapted to simultaneously operate at least some of the plurality of vibrating elements so that each of said at least some vibrating elements vibrates in at least one of a different pattern, a different velocity, a different frequency, and a different intensity.

More optionally, the wristband operating command is indicative of at least one of the execution and lack of execution of the device operating command.

Optionally, each of the plurality of vibrating elements is positioned in a different quarter of the wristband.

More optionally, the plurality of vibrating elements are sequentially operable according to various vibrating sequences.

Optionally, the wireless communication unit is adapted to wirelessly receive an operation command from the computing device. The system further comprises a presentation unit and a controller which is adapted to operate the presentation unit according to the operation command.

According to some embodiments of the present invention, there is provided a method of transmitting commands to a computing device, the method comprising recording, using a touch surface, at least one movement vector of at least one fingertip which touches an outer surface of a wristband sized for at least partly encircling a wearer's wrist, analyzing the at least one movement vector to identify a computing device operation command, and wirelessly transmitting the computing device operation command to the computing device for processing and execution.

Optionally, the method further comprises operating a plurality of vibrating elements according to the at least one movement vector so that each the vibrating element is operated when the fingertip is in proximity thereto.

Optionally, the computing device operation command is indicative of a set of operations for the computing device to perform.

Optionally, the at least one movement vector includes a plurality of movement vectors and the at least one fingertip includes a plurality of fingertips which simultaneously touch the outer surface.

More optionally, the plurality of fingertips slide simultaneously and contiguously against the outer surface.

According to some embodiments of the present invention, there is provided a user input method comprising wirelessly receiving at least one operation command from a computing device, converting the at least one operation command to at least one instruction, and operating a plurality of vibrating elements located in a plurality of portions of a wristband device sized for at least partly encircling a wearer's wrist so that each of the vibrating elements vibrates a respective portion in at least one of a different pattern, a different velocity, a different timing and a different intensity.

Optionally, the plurality of vibrating elements vibrates simultaneously.

According to some embodiments of the present invention, there is provided a user input system comprising a wristband structure sized for at least partly encircling a wearer's wrist and having a plurality of portions, a plurality of vibrating elements, each positioned to vibrate another portion, a wireless communication unit adapted to wirelessly receive an operation command from a computing device, and a controller adapted to convert the operation command to at least one instruction which is forwarded to operate the plurality of vibrating elements so that each vibrating element vibrates in at least one of a different pattern, a different velocity, and intensity.

According to some embodiments of the present invention, there is provided a method of pulling data from a communication device. The method comprises recording, using a touch surface, at least one gesture of at least one fingertip which touches an outer surface of a wristband device sized for at least partly encircling a wearer's wrist, the at least one gesture is indicative of a data query, analyzing the at least one gesture on the wristband device to identify the data query, wirelessly transmitting the data query to a communication device which manages a record indicative of acceptance or non acceptance of a message from a human peer, receiving a response to the data query, the response being set according to the record.

Optionally, the method further comprises operating at least one vibrating element installed in the wristband device according to the response.

Optionally, the at least one vibrating element comprises a plurality of vibrating elements and the operating comprises selecting which of the plurality of vibrating elements to vibrate according to the location of the at least one fingertip.

Optionally, the method further comprises receiving from a user instructions defining the data query and associating the at least one gesture with the data query.

Optionally, the message is selected from a group consisting of: a missing call message, a voice mail message, a short message service (SMS), a multimedia messaging service (MMS), an instant messaging (IM) message, and an application notification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of the method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
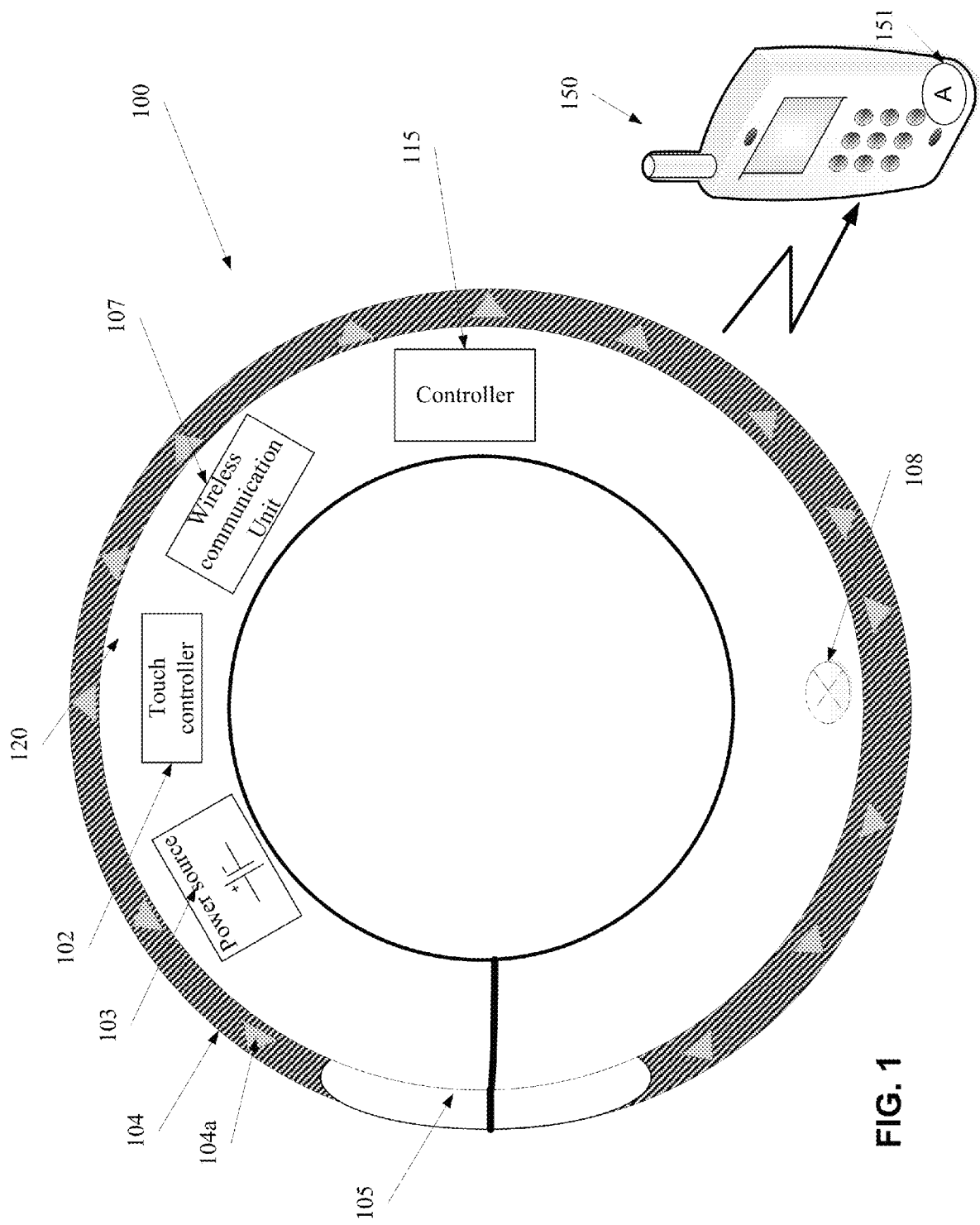
FIG. 1 is a schematic illustration of a wristband device which operates a computing device according to inputs from its touch surface, according to some embodiments of the present application.

The present invention, in some embodiments thereof, relates to user interfaces and, more particularly, but not exclusively, to a wristband having a user interface and a method of using thereof.

According to some embodiments of the present invention, there are provided methods and systems wherein a wristband sized for at least partly encircling a wearer's wrist has a touch surface operative to detect touch and/or slide events, for example a movement vector of one or more fingertips which slide contiguously against the outer surface of the wristband. The detected touch and/or slide events are used to operate a computing device, such as a Smartphone, optionally contextually based on an application which is currently active at the computing device.

The wristband optionally includes a touch controller which analyzes the touch and/or slide events to identify computing device operation commands and a wireless communication unit which wirelessly transmits the computing device operation command to the computing device, for example according to Bluetooth™ protocol.

Optionally, the computing device hosts a software module which translates the received commands to operate application(s) in and/or function(s) of the computing device.

According to some embodiments of the present invention, there are provided methods and systems of operating a plurality of vibrating elements in a wristband having a plurality of vibrating elements in a plurality of wristband portions according to operation commands wirelessly received from a computing device. The vibrating elements may be operated so that each vibrating element vibrates in a different pattern, a different velocity, a different timing and/or a different intensity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a wristband 100 which operates a computing device 150 according to inputs from a touch surface 104 operative to detect one or more touch events and/or movement vectors of one or more fingertips which touch and/or slide contiguously against the touch surface 104 of the wristband 100, according to some embodiments of the present application. The computing device 150 may be a laptop, a cellular phone, such as a Smartphone, a tablet, a personal computer, and/or the like. The fingertips may touch the touch surface 104 and/or slide in contact with and/or in a proximity to the touch surface 104. The wristband 100 may be any band sized for at least partly encircling a wearer's wrist and having an outer surface. As used herein, at least partly encircling means encircling at least 10% of a certain perimeter, for example 40%-80% of a certain perimeter, 90% of a certain perimeter and/or any intermediate or larger portion of the perimeter.

The computing device 150 optionally hosts a wristband communication module 151, for example an add-on, an application, such as a Smartphone app and/or the like. The wristband communication module 151 is designed to receive and send wirelessly operation command(s) from/to the wristband 100, for example as described below, and to translate them to a respective operation on the computing device 150, for example a currently active application, such as a phone application that has a user interface displayed on the screen of the computing device or a phone application that runs in the background of the computing device, a player, a game, a browser and/or the like. As further described below, wristband communication module 151 may manage user interface to allow configuring the communication between the computing device 150 and the wristband 100.

The wristband 100 includes a wristband structure 120 such as a plastic injected fixed and/or semi flexible band having the above components embedded there and/or placed in designated niches. The wristband structure 120 supports the touch surface 104. The wristband structure 120 optionally includes a clasping unit 105 for wearing and removal. The wristband structure 120 is optionally flexible to allow a wearer to manually extend the perimeter of the wristband 100 before the wearing thereof. Optionally, the wristband structure 120 may have an unclosed shaped, namely a crescent shaped.

Optionally, the touch surface 104 at least partly encircles the wristband structure 120, for example covers at least 10% of its outer surface. The touch surface 104 optionally includes one or more sensing surfaces, optionally flexible, based on "capacitive coupling" and/or resistive sensors. Optionally, an array of touch sensors, each such as 104a, are seamlessly integrated into the wristband structure 120 and/or positioned behind a cover. Optionally, the touch surface 104 is designed to identify one or more touch events, for example single-finger and/or multi-finger hold and/or touch operations. Optionally, the touch surface 104 is designed to identify a number of fingertip slide events which occur simultaneously, for example multi-finger swipe and/or pinch operations.

The fingertip slide event may be a fingertip or a tip of a fingertip simulating device which slides contiguously against the touch surface 104. Additionally or alternatively, the touch surface 104 is designed to identify one or more fingertip touch events which occur simultaneously and/or with a fingertip slide event.

The wristband 100 includes a touch controller module 102 which analyzes the touch and/or slide events, optionally using a processor, such as a controller 115 for example a microcontroller, and generates and/or selects one or more computing device operation commands accordingly. For example, the touch controller module 102 analyzes on or more movement vector(s) of the fingertip(s) sliding contiguously against the touch surface 104. The computing device operation commands are optionally selected by matching between the signature of the touch and/or slide events and reference signatures associated with computing device operation commands, for example from a list or a table. The matching may be performed using a hash table. The computing device operation commands are optionally, user inputs such as moving cursor, selecting, browsing, answering a call, declining a call, initiating a function of an application executed on the computing device 150, terminating a function executed on the computing device 150, and/or the like.

The wristband 100 further includes a wireless communication unit 107 which wirelessly connects to the computing device 150 and transmits thereto the computing device operation command(s) and/or receives commands and information therefrom. The wireless communication unit 107 is optionally a wireless local area network (WLAN) communication unit, for example a wireless fidelity (Wi-Fi)™ according to IEEE 802.11 protocol, and/or wireless personal area network (WPAN), such as a Bluetooth™ communication unit, a ZigBee™ communication unit and/or a Wibree™ communication unit. The wristband 100 further includes a power source 103, such as a rechargeable battery with a connection to a socket, for example mini universal serial bus (USB) socket.

Optionally, the wristband 100 further includes a presentation unit, such as a liquid crystal display (LCD) and/or a light emitting diode (LED), to indicate a status, a connection to the computing device 150, a charging level of the power source 103 and/or the like. Optionally, the LED is operated by a controller, such as 115, for example based on an operation command received from the computing device 150. Optionally an audio alert unit is embedded to provide audible indications to received information and feedback.

Optionally a motion sensor such as a 3-axis accelerometer is embedded to provide input information, standalone or contextual relative to other operations, for example, while the vibration alert is activated, shaking the hand will stop the vibration.

In use, the wristband communication module 151 translates the computing device operation command(s) according to the application that the user currently interfaces with using the computing device 150, for example the application that is currently selected and/or presented on its computing device 150. In such a manner, the wearer of the wristband 100 can activate the computing device 150, for example a Smartphone, by a simple fingertip gesture and without even looking at it, for example during driving, cooking, running or biking.

For example, FIGS. 2A-2D are top view schematic illustrations of the wristband 100 with an icon indicating the directions of two fingertips which slide simultaneously on its outer surface to indicate one of various computing device operation command(s), according to some embodiments of the present invention.

Figure 2A:
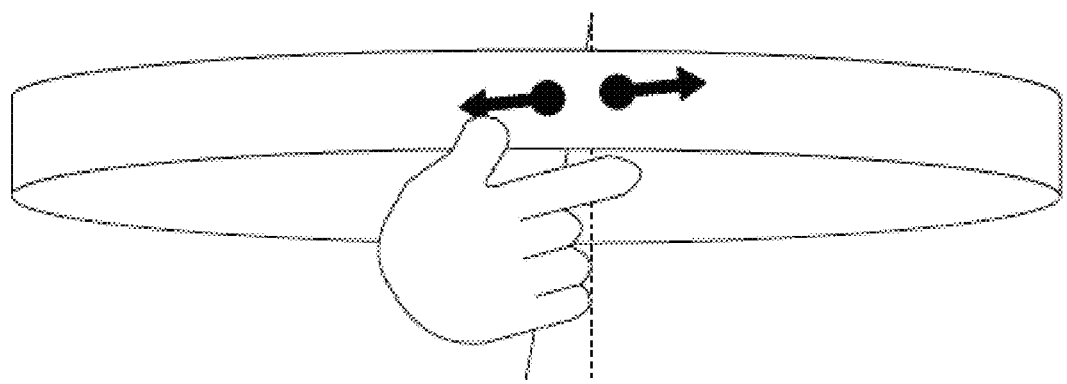
FIGS. 2A-2D are top view schematic illustrations of a wristband with an icon indicating two directions of two fingertips which slide simultaneously on its outer surface to indicate one of various computing device operation command(s), according to some embodiments of the present invention.

In FIG. 2A, two fingertips are moved against each other while touching the touch surface 104. Computing device operation command(s) generated according to a signature generated based on these motion vectors may be translated to "next track" operation when the active application is a player, "reject the call" operation when the active application is a phone in a ringing state, and "open new tab" when the active application is a web browser.

Figure 2B:
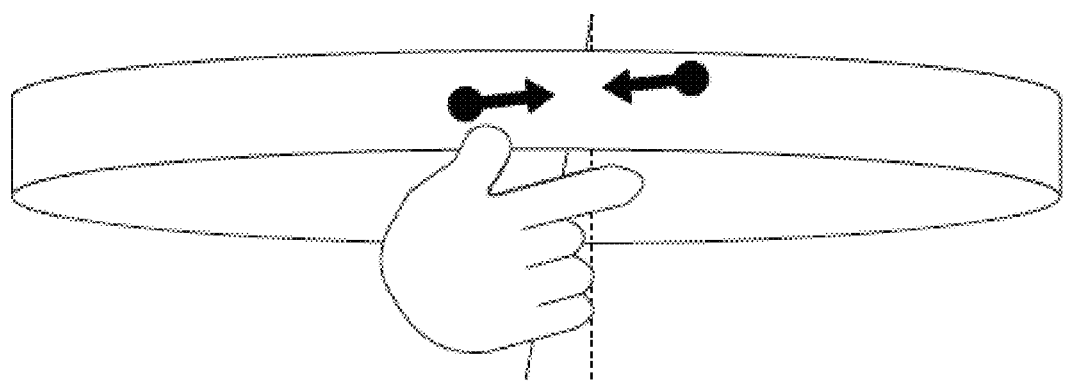

In FIG. 2B, two fingertips are moved toward each other while touching the touch surface 104. Computing device operation command(s) generated according to a signature generated based on these motion vectors may be translated to "stop" operation when the active application is a player, "silent the ringtone" operation when the active application is a phone in a ringing state or in an idle state, and "Close" when the active application is a web browser.

Figure 2C:
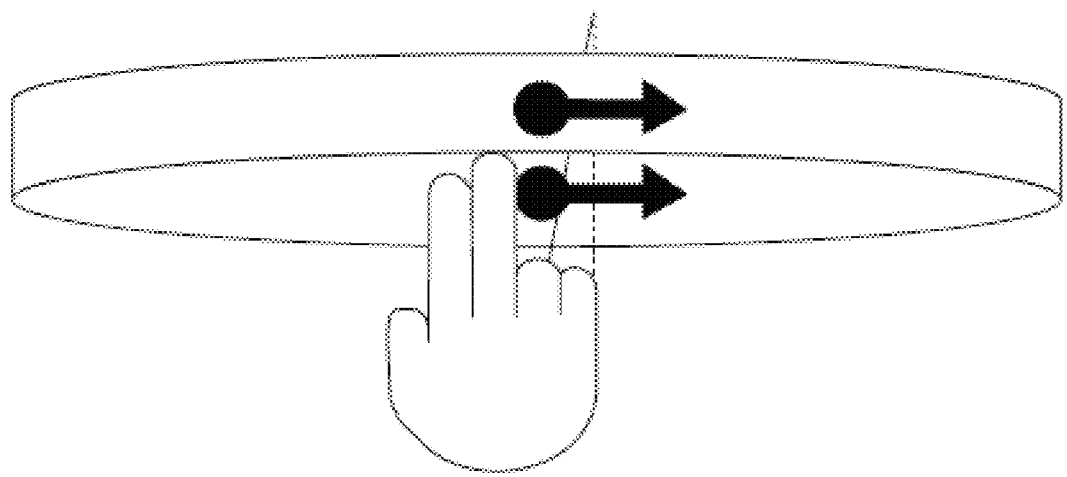

In FIG. 2C, two fingertips are moved to the right while touching the touch surface 104. Computing device operation command(s) generated according to a signature generated based on these motion vectors may be translated to "increase volume" operation when the active application is a player, "send default meeting SMS" operation when the active application is a phone in an idle state, and "Next" when the active application is a web browser.

Figure 2D:
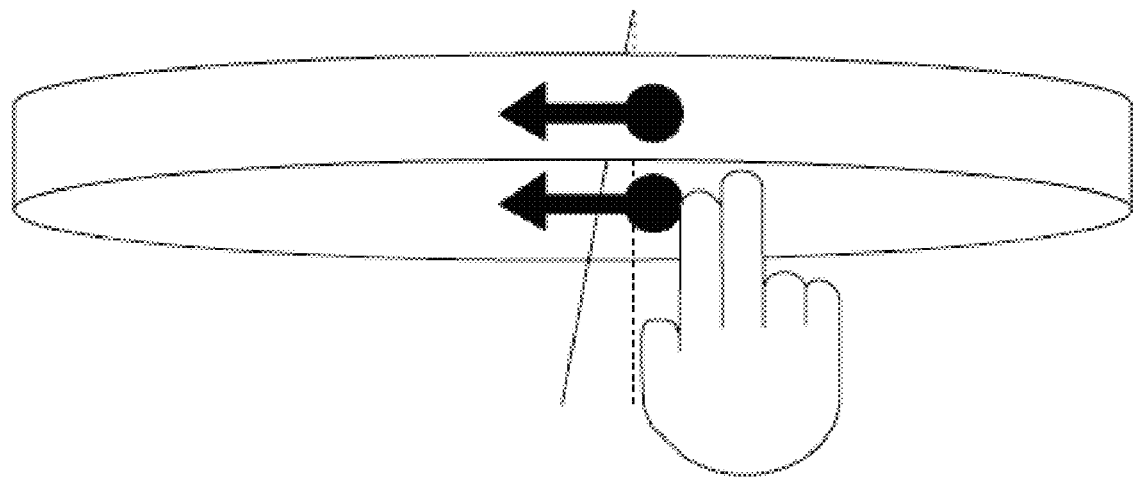

In FIG. 2D, two fingertips are moved to the left while touching the touch surface 104. Computing device operation command(s) generated according to a signature generated based on these motion vectors may be translated to "decrease volume" operation when the active application is a player, "silent" operation or "open SMS editor" operation respectively when the active application is a phone in an idle state or ringing state, and "Next" when the active application is a web browser.

Figure 2E:
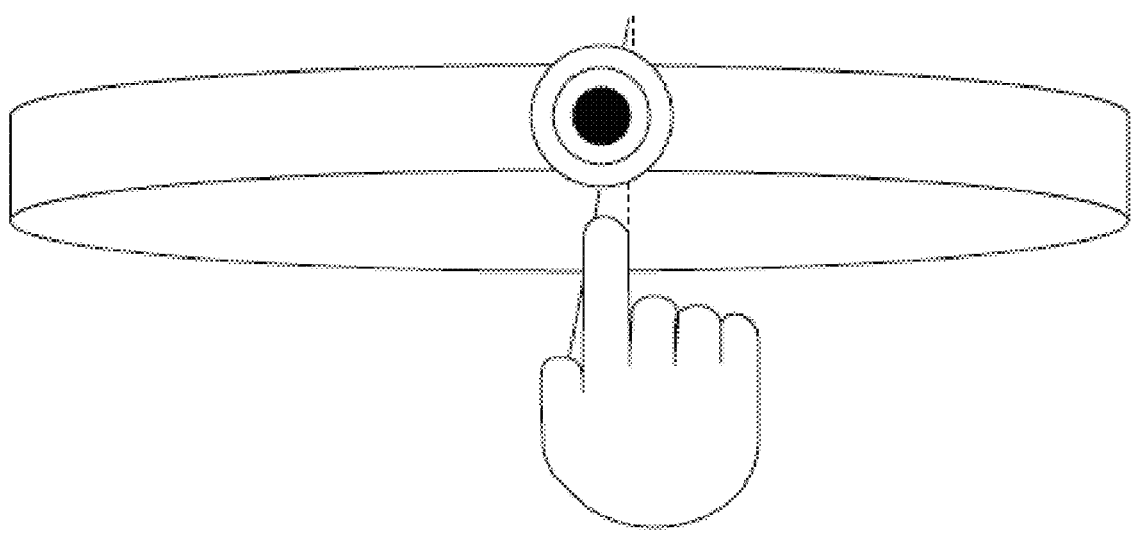
FIG. 2E is a top view schematic illustration of a wristband with an icon indicating a fingertip touch on its outer surface to indicate one of various computing device operation command(s), according to some embodiments of the present invention.

Reference is also made to FIG. 2E, which is a top view schematic illustration of the wristband 100 with an icon indicating the touch of one fingertip on the touch surface 104 to indicate one of various computing device operation command(s), according to some embodiments of the present invention. In this figure, computing device operation command(s) generated according to the touch event may be translated to "pause/play" operation when the active application is a player, "activate speaker" operation or "activate phone voice recognition" operation respectively when the active application is a phone in an ringing state or idle state, and "Submit" when the active application is a web browser. Tapping with two fingers simultaneously will be translated to "go to the beginning of a track" operation when the active application is a player, "answer call" operation when the active application is a phone in a ringing state or in an idle state, and "activate screen and show calendar" when the computing device is idle.

As further described below, an acknowledgment of any touch and/or slide events, including the above examples, may be received from the computing device and translated to a haptic response in the form of a predefined vibrating pattern.

Optionally, operation command(s) generated according to touch and/or slide events are combined with an input of a simultaneous activity executed on the computing device, for example voice recognition. In such a manner, another layer of information is provided together with the simultaneous activity. For example, a first operation command received with the voice recognition input "Call Ruth" will be translated to a default call command and a second operation command received with the same voice recognition input may be translated to a call without providing call identifier command.

It should be noted that the translation of different computing device operation commands generated by different fingertip gestures may be set manually by the wearer, for example using a designated graphical user interface (GUI) that is presented on the computing device 150, for example by the wristband communication module 151. As exemplified above, call operations, such as mute, call and reject call, media playing control, and/or various functions and applications control may be performed using the wristband 100. The wristband may also be used for computing device profile change, for example from silent state to general state and/or from silent state to work state and/or the like. This may allow avoiding interruptions in situations such as sleeping, meetings, training and and/or the like.

Figure 3:
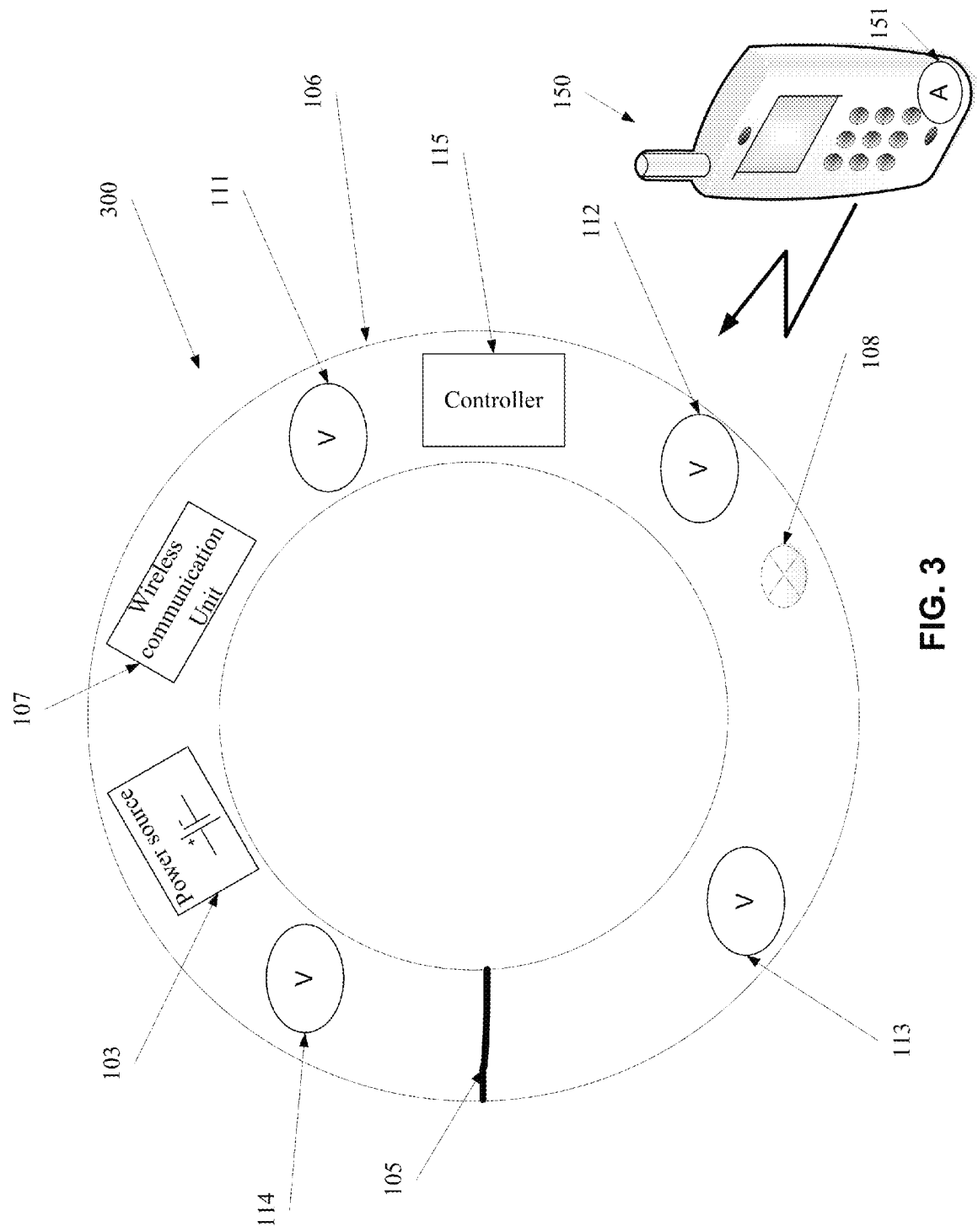
FIG. 3, which is a schematic illustration of a wristband which operates a computing device and is similar to the wristband depicted in FIG. 1 and further depicts a set of vibrating elements, according to some embodiments of the present invention.

Reference is now also made to FIG. 3, which is a schematic illustration of a wristband 300 that is similar to the wristband 100 depicted in FIG. 1. However, FIG. 3 does not depict the touch surface 104 and the touch controller 102 and further depicts a set of vibrating elements 111-114, such as piezoelectric transducers, which are operated by the controller 115, according to some embodiments of the present invention. The vibrating elements 111-114 provide a haptic feedback that provides information to the wearer.

Each one of the vibrating elements 111-114 is positioned to vibrate another portion of the wristband 300, for example another quarter of a perimeter annular portion, third of a perimeter annular portion, and/or a sixth of a perimeter annular portion. In these embodiments, the wireless communication unit 107 is set to receive wirelessly operation command(s) from the computing device 150. The operation command(s) may be translated to various vibration patterns which are implemented by the vibrating elements 111-114.

Optionally, the operation command(s) are selected, for example by the wristband communication module 151, in a contextual manner, for example based on the application which is currently active on the computing device 150 and/or the state of the currently active application.

The translation may be set automatically and/or manually, for example by a designated GUI. For example, different vibration patterns may indicate the receiving of a voice mail, a call, a short message service (SMS), an instant message, and/or the like. In such embodiments, the controller 115 converts the received operation command(s) to vibrating element instructions which are forwarded to operate the vibrating elements 111-114. Optionally, a number of vibrating elements are set to vibrate simultaneously. Additionally or alternatively, each vibrating element 111, 112, 113, 114 may be instructed to vibrate according to a different pattern, at a different frequency, at a different velocity, and/or at a different intensity. Additionally or alternatively, the vibrating elements 111-114 may be instructed to vibrate sequentially.

For example, reference is now made to FIGS. 4A-4E, which are lateral schematic illustrations of a wristband with curved lines indicating a direction of vibrating element operation, according to some embodiments of the present invention.

Figure 4A:
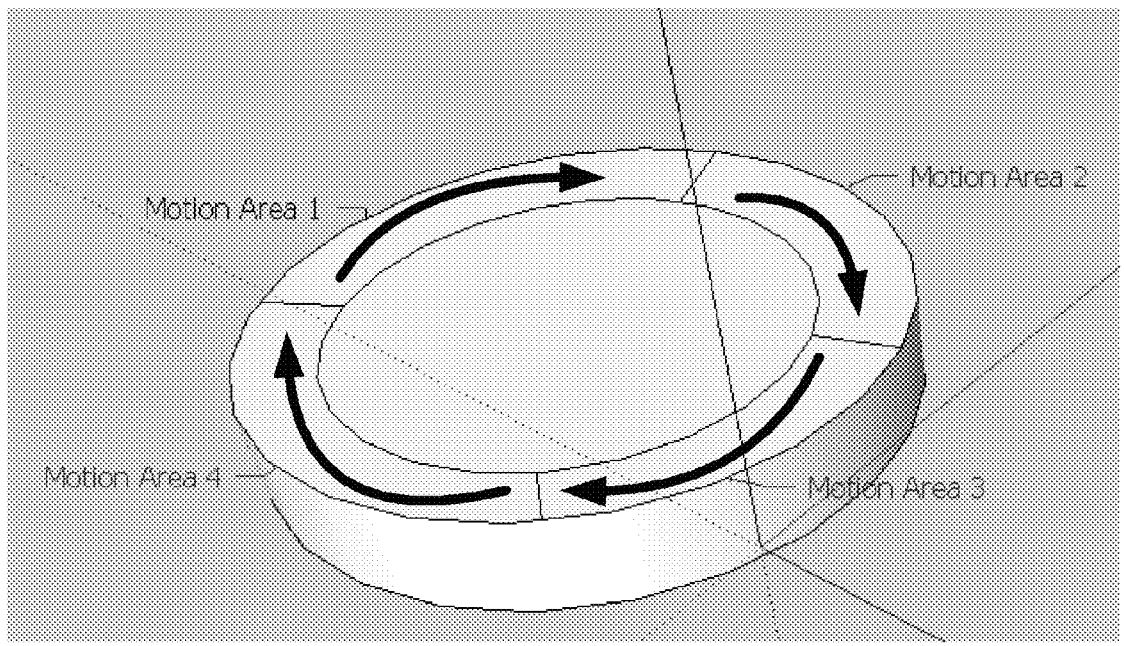
FIGS. 4A-4E are lateral schematic illustrations of a wristband with curved lines indicating a direction of vibrating element operation, according to some embodiments of the present invention.

In FIG. 4A, the vibrating elements in four vibration areas of the depicted wristband are operated to vibrate sequentially in reduced intensities or frequency. In such a embodiment, the wearer feels a declined circular vibrating pattern starting from an area tagged as "Vibration area 1", to an area tagged as "Vibration area 2", to an area tagged as "Vibration area 3" and to an area tagged as "Vibration area 4". In this case, the vibration power decreases with time so that the vibration in "Vibration area 1" is the strongest and decreasing at the next area so that the vibrating in "Vibration area 4" is the weakest.

Figure 4B:
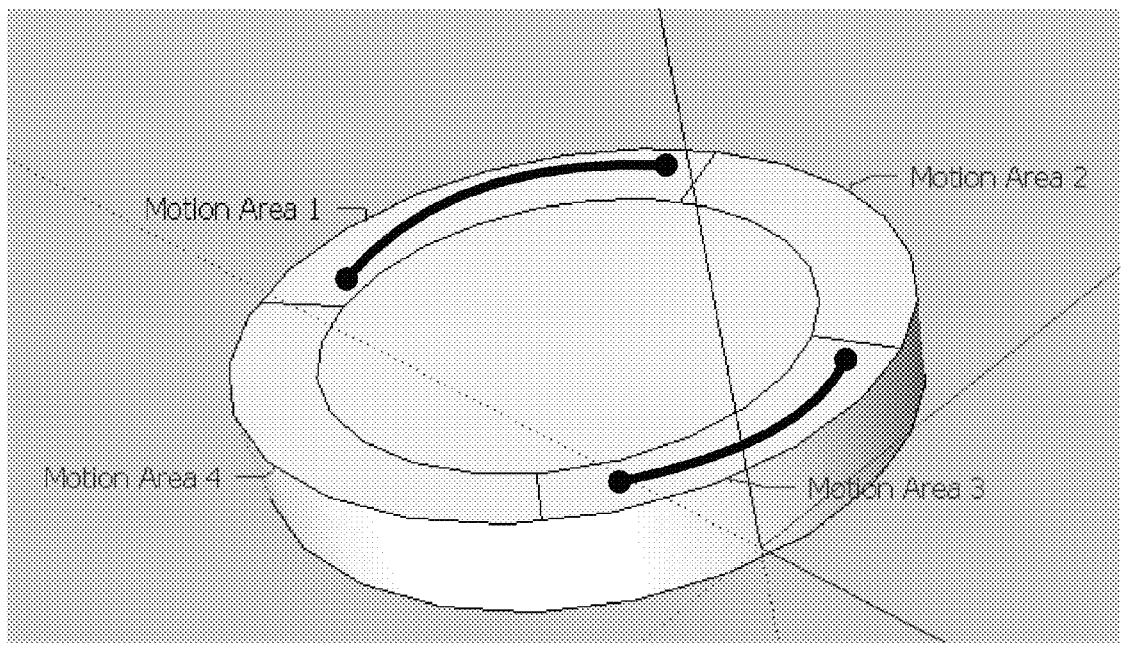

In FIG. 4B, the vibrating elements in two opposing vibration areas of the depicted wristband are operated to vibrate alternately in a high intensity or frequency. In such a manner, the wearer feels a strong alternating vibration between "Vibration area 1" and "Vibration area 3". Optionally, opposing vibrating elements may work simultaneously and alternately with other vibrating elements (for example Vibration areas 1 and 3 are operated alternately with Vibration areas 2 and 4). Optionally, opposing vibrating elements may be operated in different intensities and/or frequencies.

Figure 4C:
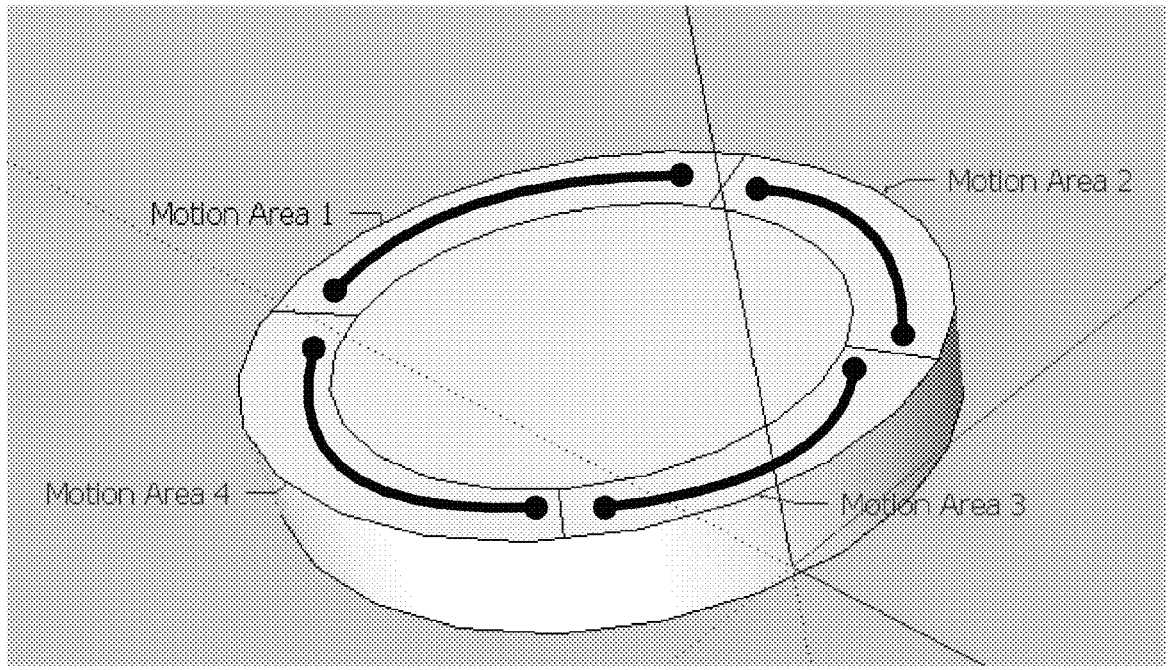
Figure 4D:
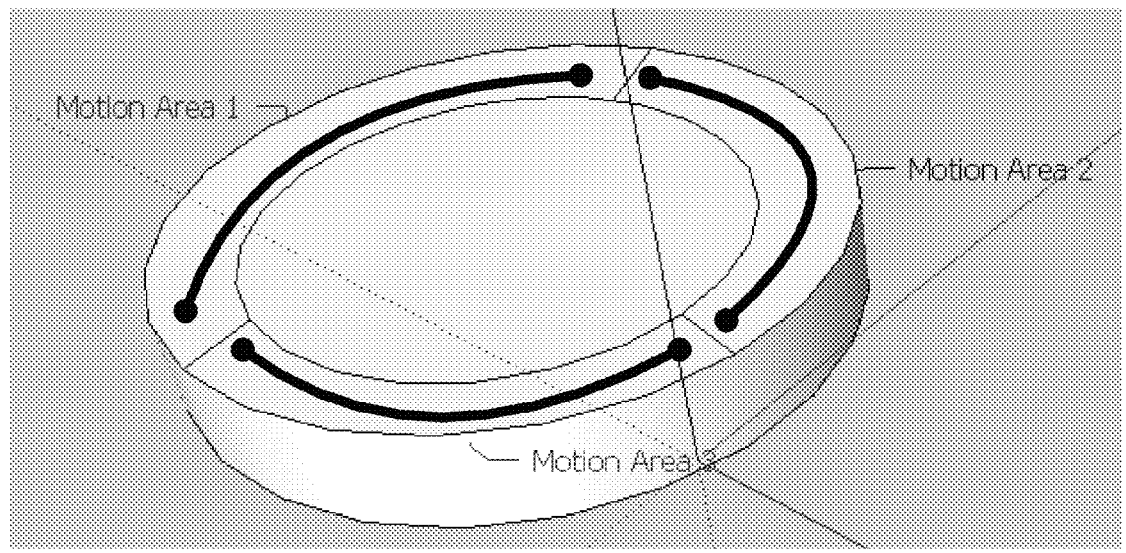
Figure 4E:
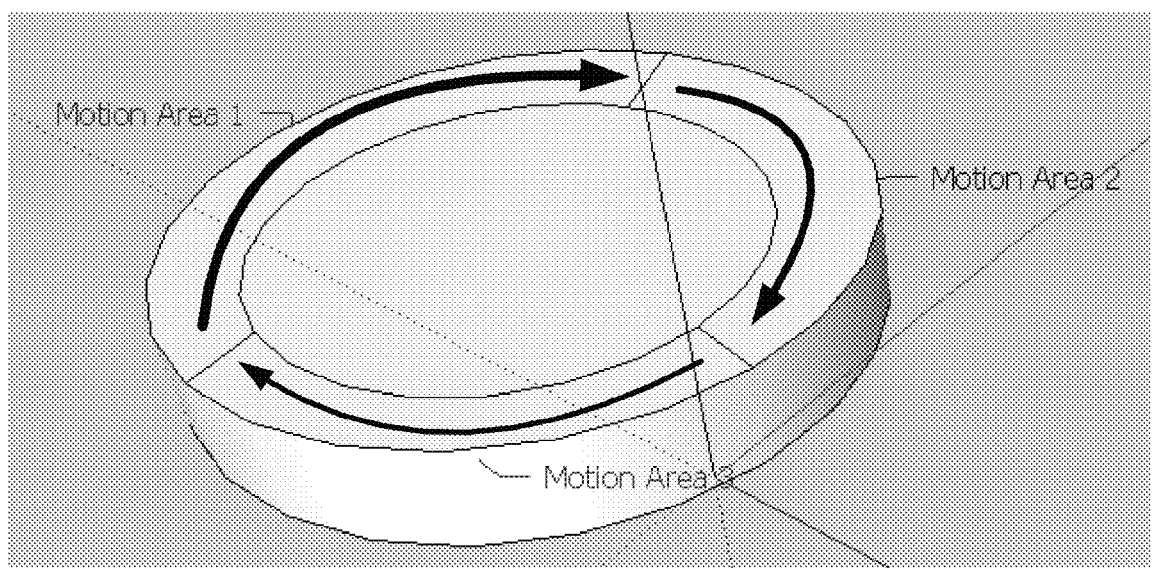

In FIG. 4C, vibrating elements in all the vibration areas of the depicted wristband are operated simultaneously.

It should be noted that the wristband may be divided to any various numbers of vibration areas by distributing and allocating vibrating elements in a respective manner. For example, in FIGS. 4D and 4E, the wristband is divided to three vibration areas that can be activated simultaneously and sequentially in similar and/or different intensities and/or frequencies.

Figure 5:
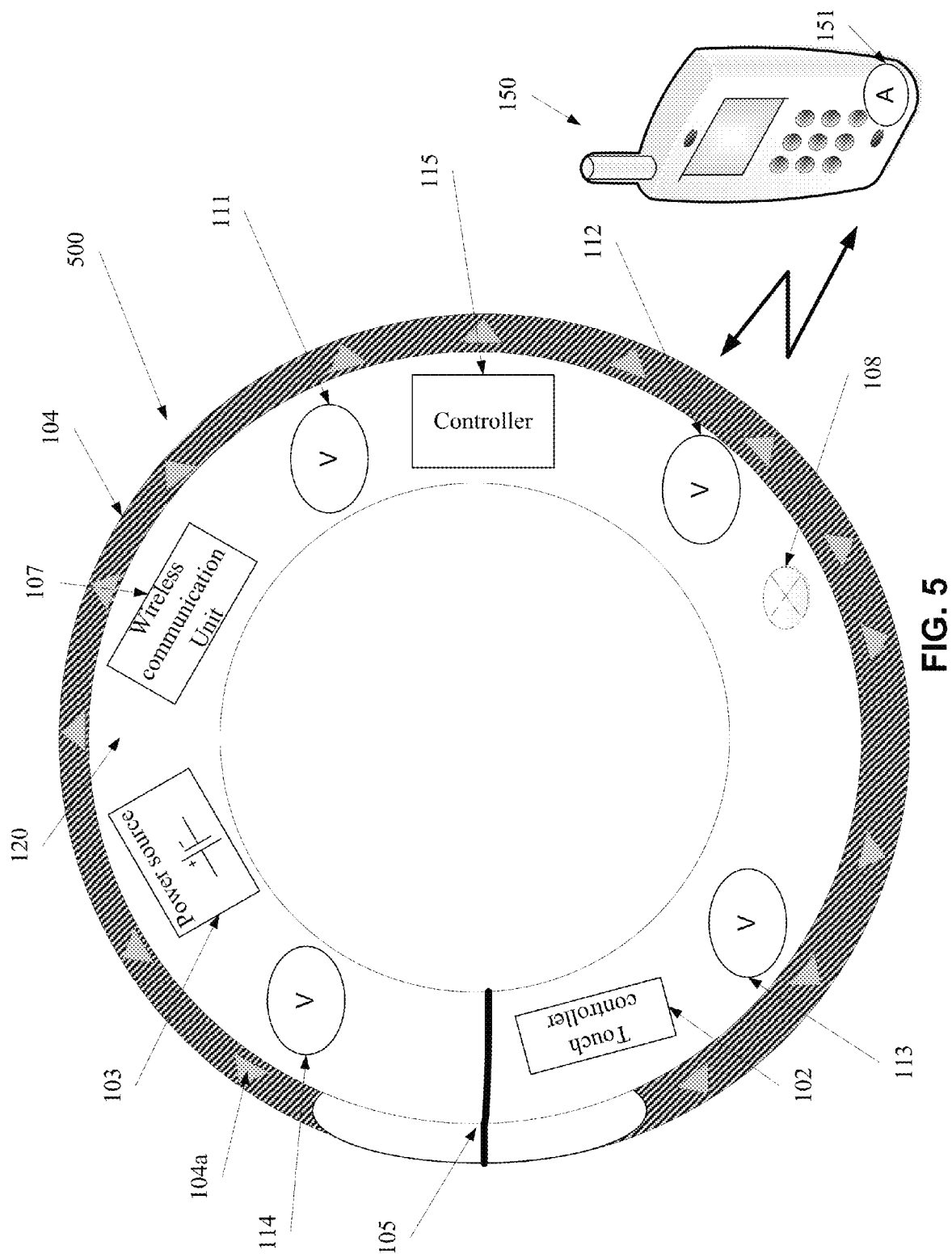
FIG. 5 is a schematic illustration of a wristband, similar to the wristbands depicted in FIGS. 1 and 3, and having a bi directional communication with the computing device, according to some embodiments of the present invention.

Reference is also made to FIG. 5, which is a schematic illustration of a wristband 500 which is similar to the wristbands 100 and 300 depicted in FIGS. 1 and 3. However, FIG. 5 units components from FIGS. 1 and 3 namely includes both vibrating elements 111-114 and the touch surface 104 and the touch analyzer 102, according to some embodiments of the present invention. In such embodiments, the wristband 500 has bidirectional communication with the computing device 150 and therefore may be used to interact therewith in an interactive manner, for receiving contextual notifications as a sequence of vibrations and responding to the contextual notifications by fingertip gestures.

Optionally, the bidirectional communication allows a user to pull information which is usually push information from the computing device 150. For example, the bidirectional communication may be used to allow the user to slide and/or touch the touch surface 104 for querying whether any or a certain message (i.e. an email, and short message service (SMS), an application notification, and/or an instant messaging (IM) message has been received from any or a certain contact or peer. In such an embodiment, the wristband communication module 151 may manage a set of data for pulling rules which define which information is pulled in response to an operation command or any other message triggered by a touch and/or a slide event. These rules are optionally stored in the memory of the computing device 150. Optionally, a designated GUI which is presented by the wristband communication module 151 on the display of the computing device 150 may be used to allow a user to define data for pulling rules, namely which information should be pulled in response to which operation command, for example a sending and/or a calling contact and/or a text including word(s) converted from an audio message and/or a type of a message (e.g. missed call, SMS, multimedia messaging service (MMS) and IM message). In use, when an operating command is sent to the computing device 150 as an outcome of a touch event or a slide event selected by the user, the computing device 150 acquires the information to be pulled and responds to the operation command. In such a manner, alerts and/or alarms of the computing device 150 may be shutdown (e.g. rings, vibrations, lighting and/or display indications) and replaced with a predefined haptic feedback that is provided by the wristband 500.

Optionally, a number of different haptic feedbacks may be defined to reflect different outcomes. For example, if the information to be pulled is information about whether a message has been received, one haptic feedback (i.e. a pattern of vibrations) is indicative of receiving the message and another is indicative of not receiving the message. Optionally, the haptic feedbacks encode information extracted from received messages.

In one example, before a user starts an important meeting that requires him to put the computing device 150, a phone, in a silence mode the user uses the above mentioned GUI to select a special vibrating pattern for notifying him when an SMS or IM or a missed call is received from a selected person, for example his wife. During the meeting, the user occasionally checks if he got a message from the selected person by swiping his finger on the wristband 500. If a received haptic feedback, such as a signal vibration occurs, he knows he didn't get a message from the selected person; and if two vibrations occur, he knows he got a message from the selected person. Optionally, if the received message includes a known symbol, a word, and/or a sign, for example OK, Not OK, Urgent, ":>", and/or now, a selected vibrating pattern which is associated with the known symbol, word, and/or sign is instructed by the controller.

According to some embodiments of the present invention, the vibrating elements 111-114 are operated to provide a haptic feedback in an area of the touch surface 104 which detects the touch event and/or the slide event. Optionally, the vibrating elements 111-114 are operated to follow the location of the user's fingertip. In such a manner, when a user slides his fingertip along portion A of the wristband, respective vibrator A responds, and when the user slides his fingertip toward portion B, the vibrating element of portion A fades and the vibrating element from portion B is activated.

Figure 6:
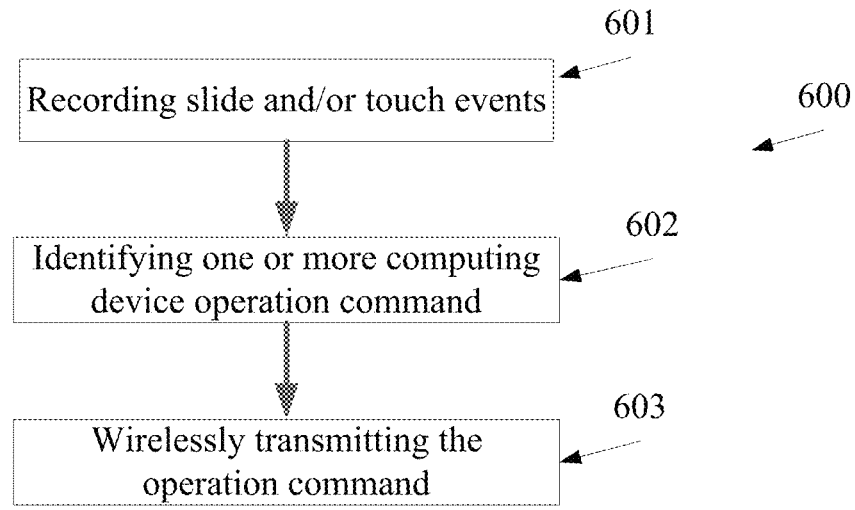
FIG. 6 is a flowchart of a method of transmitting commands to a computing unit, according to some embodiments of the present invention.

Reference is now made to FIG. 6, which is a flowchart 600 of a method of transmitting commands to a computing unit, for example using the above described wristband, according to some embodiments of the present invention. First, as shown at 601, a touch surface located at an outer surface of a wristband sized for encircling a wearer's wrist is used to record touch and/or slide event of one or more fingertips. Then, as shown at 602, the touch and/or slide events, for example movement vectors, are analyzed to identify one or more computing device operation command(s). The computing device operation command(s) are wirelessly transmitted to a computing device, such as 150 which operates accordingly the computing device, optionally in a contextual manner based on an application that is currently active.

Figure 7:
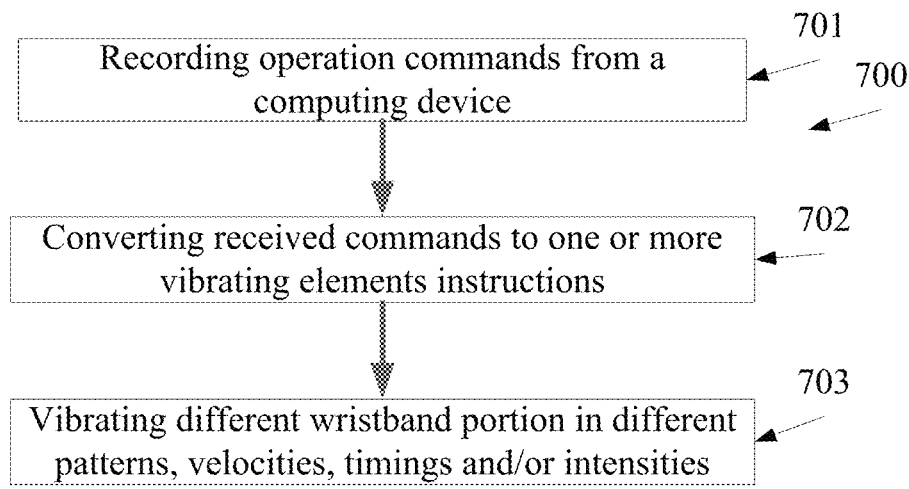
FIG. 7 is a flowchart of a method of operating vibration elements in a wristband, according to some embodiments of the present invention.

Reference is now made to FIG. 7, which is a flowchart 700 of a user input method, which is optionally implemented using the above-described wristband, according to some embodiments of the present invention. First, as shown at 701, one or more operation commands are wirelessly received from a computing device, such as 150, at a wristband device sized for encircling a wearer's wrist, such as 300 and 500. Then, as shown at 702, the operation commands are converted to one or more instructions. Now, as shown at 703, a plurality of vibrating elements in the wristband are operated according to the operation commands so that the vibrating elements vibrate different portions of the wrist in a different pattern, a different velocity, a different timing and/or a different intensity, for example as described above.

Figure 8:
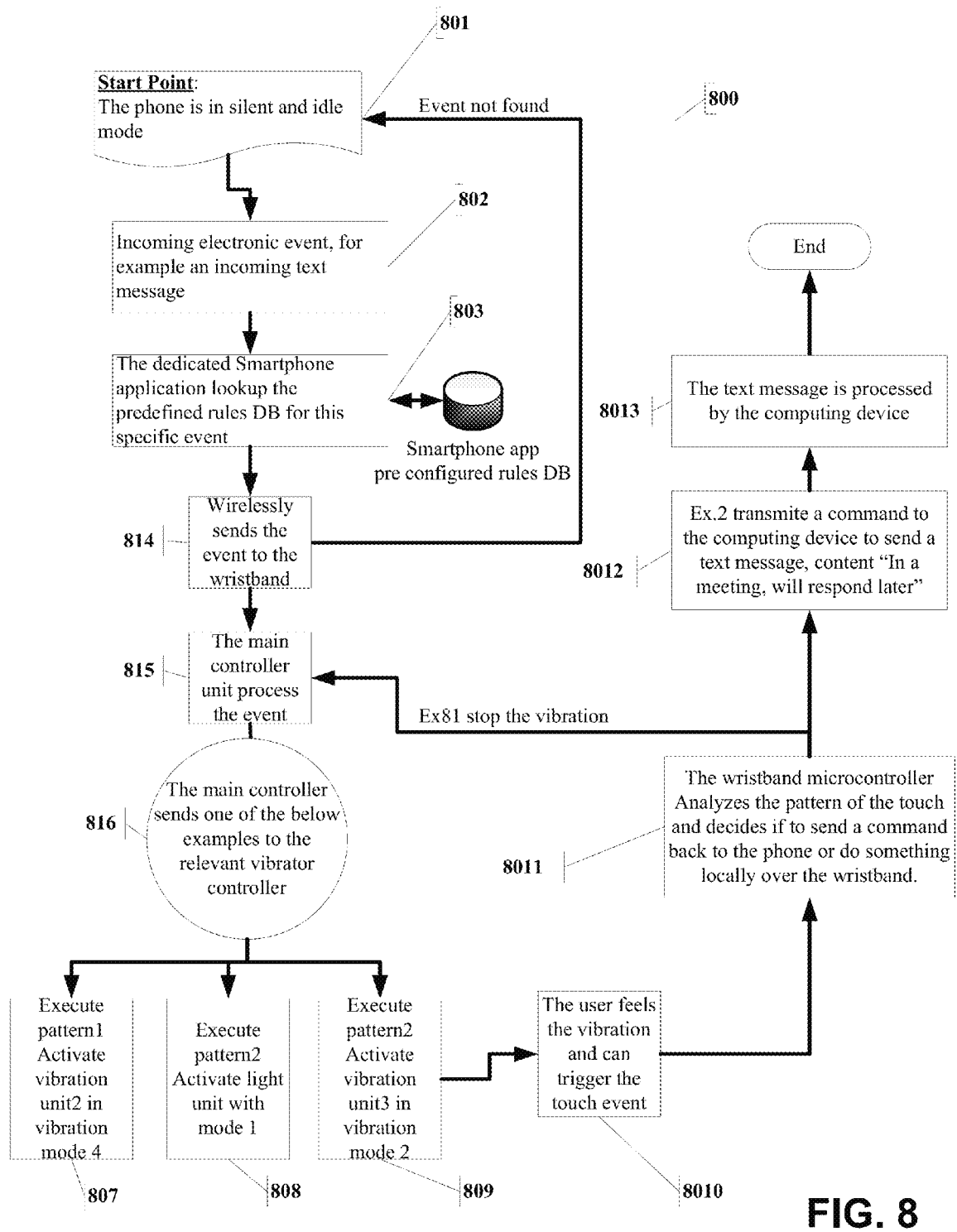
FIG. 8 is a flowchart of an exemplary scenario employing a method of interfacing with a computing device using a wristband, according to some embodiments of the present invention.

Reference is now made to FIG. 8, which is a flowchart 800 of an exemplary scenario of employing a method of interfacing with a computing device using a wristband, according to some embodiments of the present invention. The method allows a user to receive notifications from a computing device and to respond to them by simple operations such as sliding a fingertip on the touch surface 104 and/or touching the touch surface 104, for example when the computing device is switched to a silent and/or idle mode, for example as shown at 801. 802-803 depict actions of the computing device 500. As depicted in the flowchart, the wristband communication module 151 checks computing device events, such as the reception of events and/or messages to identify events which comply with the set of rules. These events or indications thereof are forwarded to the wristband, 500, as shown at 814 and processed by the controller 115, as shown at 815. As shown at 816 and in 807-809, the controller 115 instructs the vibrating elements 111-114 according to the received events or indications thereof. In FIG. 8 different vibration patterns may be selected to match different events or the lack of different events (e.g. SMS from contact X was received, SMS from contact X was not received, SMS from contact X with the word OK was received, SMS from contact X with the word OK was not received and/or the like).

As depicted in 8010-8011, the user may use the touch surface 104 to trigger a response by a touch and/or slide event. This action optionally stops the vibration in any of 807-809. The touch controller 102 analyzes the touch and/or slide event to generate an operating command accordingly. As shown at 8012-8013, the operating command is wirelessly transmitted to the computing device 150 which performs an action accordingly, for example selects a predefined text message and forwards it to an addressee, which is optionally the sender of a message which triggered the vibration in any of 807-809.

Figure 9:
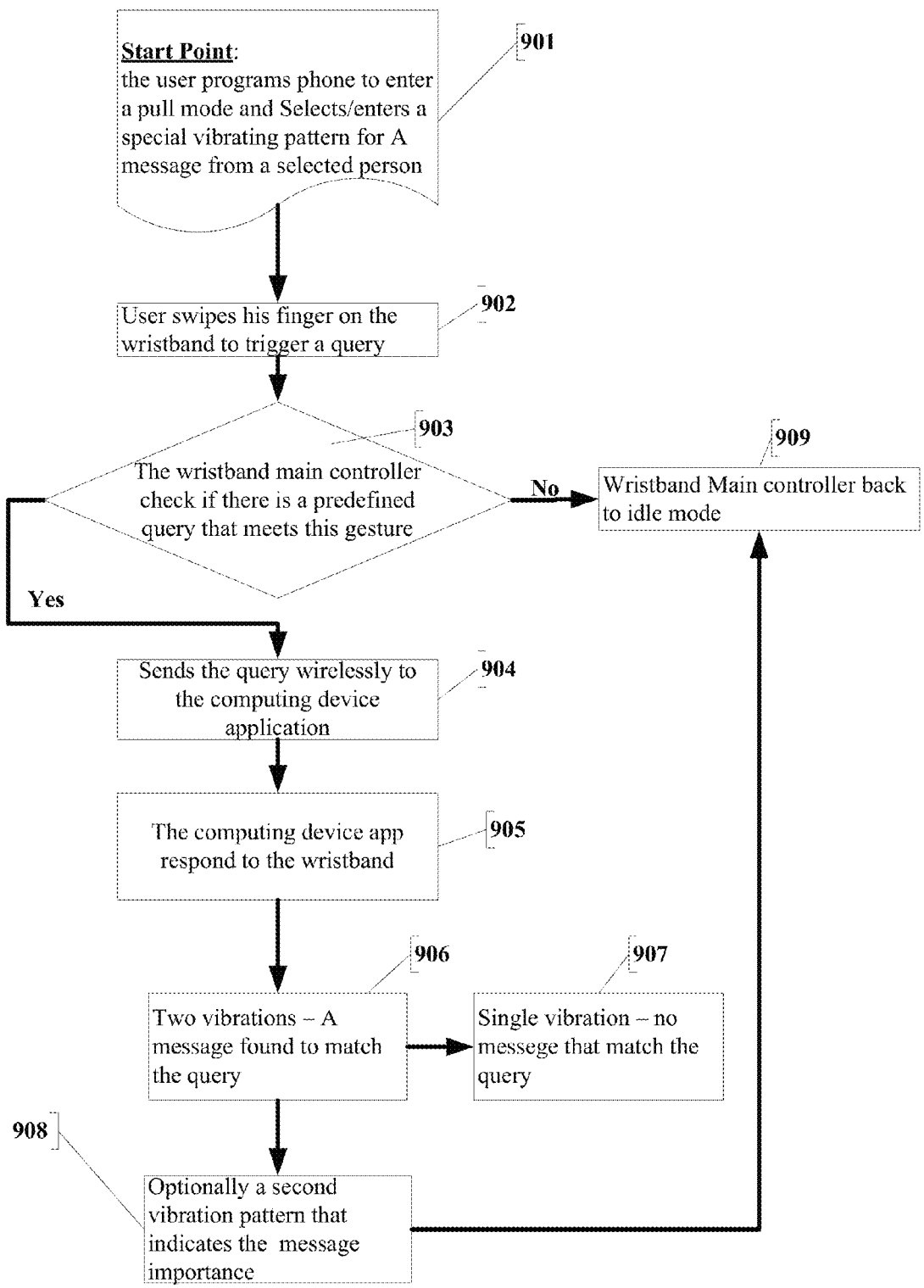
FIG. 9 is a flowchart of an exemplary scenario employing a method of pulling monitored information from a computing device, according to some embodiments of the present invention.

Reference is now made to FIG. 9, which is a flowchart 900 of an exemplary scenario of employing a method of pulling monitored information from a computing device, according to some embodiments of the present invention. The method allows a user to receive notifications from a computing device and to respond to them by simple operations such as sliding a fingertip on the touch surface 104 and/or touching the touch surface 104, for example when the computing device is switched to a pull mode, for example as shown at 901. In 902 a touch and/or a slide event is performed by the user to trigger the transmission of a pulling query to the computing device 500. As shown at 903, the touch controller 102 determines whether the touch and/or the slide pattern is indicative of an operating command that is set to send a query. If so, as shown at 904, the query is wirelessly sent to the computing device 150. A response to the query, for example an indication of a missed call, an SMS, a voice mail and/or an indication of the content thereof, is sent from the computing device 150 to the wristband 151 in response to the query. As shown at 906-908, different vibration patterns may be induced based on the response. The wristband then returns to an idle mode, as shown at 909, until another query is detected.

As exemplified in this process, a user may get various non-visual notifications and other types of information without necessarily looking on the computing device screen or on the wristband 500 as different messages, such as different incoming text messages, for example emails, application notifications, twitter messages, and Facebook notifications, may be presented by different haptic feedbacks, for example different vibration patterns, different vibration velocities, different vibration timings and/or a different vibration intensities as described above. Moreover, this unique infrastructure allows an instant message sender to set the importance or the content of the message upon sending a message with a certain symbol, character, word, and/or a sentence which are translated to a predefined vibration pattern. Optionally, messages are sent with importance indications and translated to different vibration patterns each indicative of a different level of importance. For example, for incoming message, a single vibration means a low importance, two vibrations means a medium importance and three vibrations means urgent. In other words, the receiver of the text message is able to understand the importance of the message without looking at the computing device.

Figure 10:
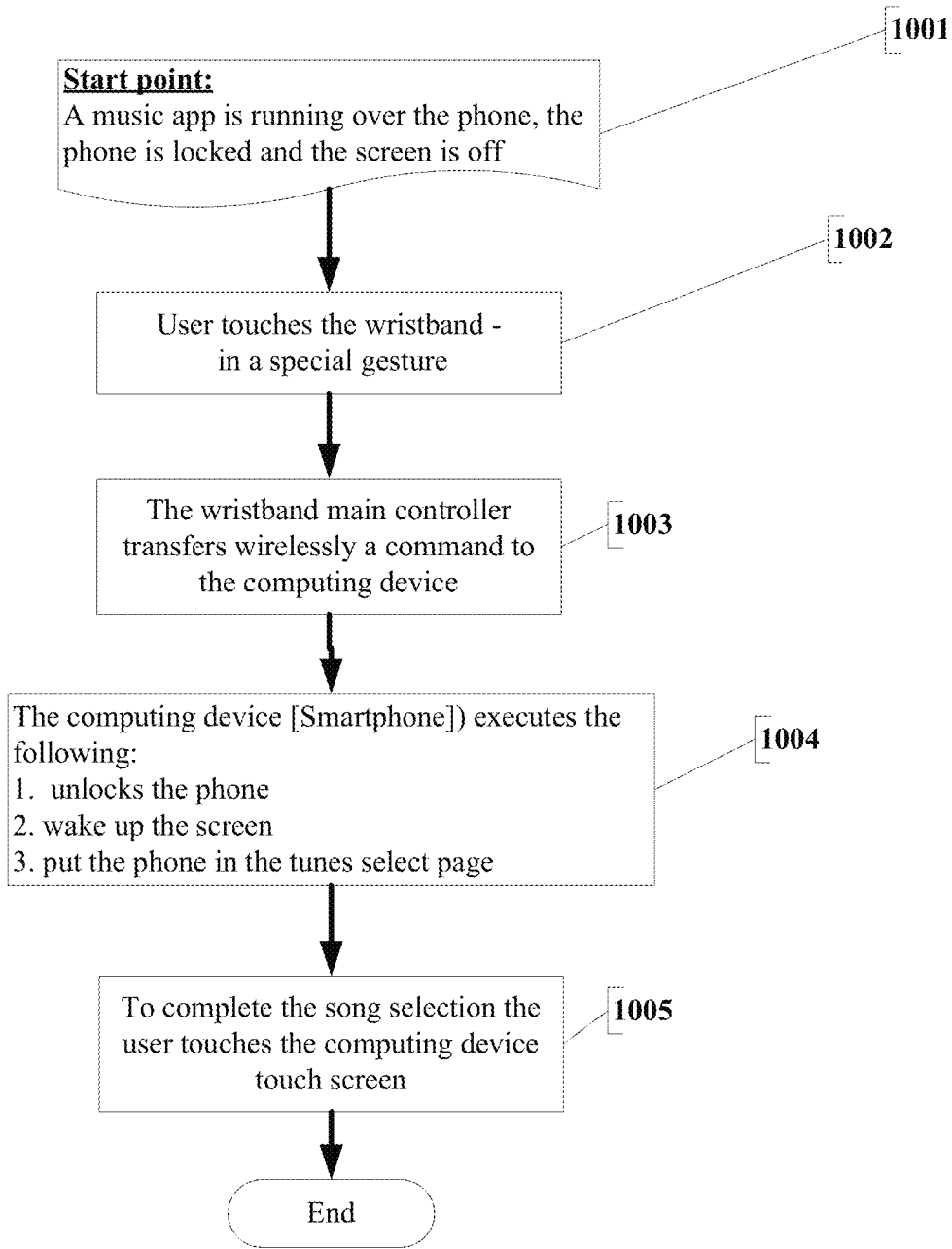
FIG. 10 is a process of activating a music player hosted on the computer device and currently in an idle mode, according to some embodiments of the present invention.

As described above, the wristband depicted in FIG. 1 or FIG. 5 allows a user to instruct operations of one or more applications installed and executed on the computing device 150. Optionally, a single touch and/or slide event performed by the user allows triggering a set of a plurality of operations held on the computing device 150. In such a manner, the user may trigger an activation a certain function, optionally with certain values, of an inactive application of the computing device 150. For example FIG. 10 depicts a process of activating a music player which is hosted on the computer device 500 and currently in an idle mode, according to some embodiments of the present invention. In another example, the user may instruct a capturing of image by sending a command operation that instructs the opening of a camera application and the capturing of an image, optionally only when certain of object appears in the image. In the process exemplified in numerals 1001-1005 of FIG. 10 a user who uses the computing device to listen to music may select a song (not the next track) when the computing device is locked and the screen is off, using a fingertip gesture on the wristband that is used to unlock the computing device, refresh the screen and instruct the player to present a menu with tracks to select from. This enables a user to change the song by one click on the screen of the computing device (i.e. a touch screen Smartphone or a tablet) instead of performing a multiple actions on the computing device.

Various other sequences of actions may be performed, for example adding status or a location data to a social network system and/or sending a message which is prepared in advance, and/or the like.

It is expected that during the life of a patent maturing from this application many relevant systems and methods will be developed and the scope of the term a transducer, a unit, a module, a controller, and a communication unit is intended to include all such new technologies a priori.

As used herein the term "about" refers to ±10%.

The terms "comprises", "comprising", "includes", "including", "having" and their conjugates mean "including but not limited to". These terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A user input system, comprising:
    a wristband structure sized for at least partly encircling a central wrist axis of a wearer's wrist and having an outer surface;
    a curved touch surface operative to detect at least one finger swipe of a fingertip which slides contiguously against said outer surface;
    a touch controller adapted to analyze said at least one finger swipe to identify a data query; and
    a wireless communication unit adapted to wirelessly transmit said data query to a computing device which is external to said user input system and to receive a response to said data query from said computing device,
    wherein said at least one finger swipe is held around said central wrist axis and along a curve of a curved portion of said curved touch surface;
    wherein said system further comprising a plurality of different vibrating elements located to provide a plurality of different haptic feedbacks on said wearer's wrist and a controller which is adapted to select one of said plurality of different vibrating elements according to said response and operate at least two of said plurality of vibrating elements which is located in said curved portion to provide at least one of said plurality of different haptic feedbacks in response to said reception of said response;
    wherein said controller is adapted to operate said at least two of said plurality of vibrating elements to vibrate simultaneously with different intensities or different frequencies.

2. The user input system of claim 1, further comprising a wristband communication module which is set to be installed in said computing device and to translate said computing device operation command to an application operation applied on an active application executed on said computing device.

3. The user input system of claim 2, wherein said wristband communication module is adapted to automatically identify said active application among a plurality of optional applications and to select said application operation accordingly.

4. The user input system of claim 2, wherein said wristband communication module is adapted to automatically identify a status of said active application and to select said application operation accordingly.

5. The user input system of claim 1, wherein said at least one finger swipe comprises a plurality of simultaneous finger swipes which are generated by a plurality of fingertips which slide simultaneously and contiguously against one another along said outer surface.

6. The user input system of claim 1, wherein said curved touch surface completely encircles said outer surface.

7. The user input system of claim 1, wherein said wristband is sized for encircling at least 40% of the perimeter of said wearer's wrist.

8. The user input system of claim 1, wherein said curved touch surface comprises a plurality of touch sensors positioned below said outer surface.

9. The user input system of claim 1, wherein each of said plurality of vibrating elements is positioned in a different quarter of said wristband.

10. The user input system of claim 1, wherein said plurality of vibrating elements are sequentially operable according to various vibrating sequences.

11. The user input system of claim 1, wherein said wireless communication unit is adapted to wirelessly receive an operation command from said computing device; said system further comprising a presentation unit and a controller which is adapted to operate said presentation unit according to said operation command.

12. The user input system of claim 1, wherein said wristband structure is without any visual indication required to be viewed for operating said wristband structure.

13. The user input system of claim 1, wherein said curved touch surface includes a plurality of sensing surfaces arranged along the length of the wristband structure, and wherein said wristband structure encircles at least 50% of the outer surface.

14. The user input system of claim 13, wherein said wristband structure encircles 100% of the outer surface.

15. The user input system of claim 1, wherein said at least one finger swipe comprises a plurality of simultaneous finger swipes which are moved toward each other or away from each other while touching said curved touch surface.

16. A user input method, comprising:
    detecting at least one finger swipe of at least one fingertip which slide contiguously along a curve of at least one curved portion of a curved touch surface mounted along a curved surface of a wristband structure sized for at least partly encircling a central wrist axis of a wearer's wrist;
    wireless transmitting a data query identified by an analysis of said at least one finger swipe to a computing device which is external to said user input system;
    receiving a response to said data query from said computing device,
    in response to said reception of said response, selecting to provide one of a plurality of different haptic feedbacks on said wearer's wrist using at least two of a plurality of vibrating elements which are located in a plurality of curved portions of said wristband device which is sized for at least partly encircling said wearer's wrist; and
    operating said at least two vibrating elements to vibrate simultaneously with different intensities or different frequencies for providing said selected haptic feedback on said wearer's wrist in response to said detection of said at least one finger swipe so that said at least two vibrating element vibrates said at least one curved portion; wherein said at least one finger swipe is held around said central wrist axis.

17. The user input method of claim 16, wherein said method involves no viewing of said wristband structure.

18. A user input system, comprising:
    a wristband structure sized for at least partly encircling a central wrist axis of a wearer's wrist and having a plurality of portions;
    a plurality of vibrating elements each positioned to vibrate another said portion, said plurality of vibrating elements are set to provide a plurality of different haptic feedbacks on said wearer's wrist;
    a curved touch surface operative to detect at least one finger swipe held around said central wrist axis, said at least one finger swipe is performed by a fingertip which slides contiguously against an outer surface of said curved touch surface;
    a wireless communication unit adapted to wirelessly transmit a data query to a computing device which is external to said user input system and adapted to wirelessly receive a response to said data query to from said computing device; and
    a controller adapted to operate at least two of said plurality of vibrating elements to provide one of said plurality of different haptic feedbacks on said wearer's wrist in response to the reception of said response;
    wherein said controller is adapted to operate said at least two of said plurality of vibrating elements to vibrate simultaneously with different intensities or different frequencies.

19. A method of pulling data from a communication device, comprising:
    recording, using a curved touch surface of a wristband device, at least one finger swipe of a fingertip which touches at least one curved portion of an outer surface of said curved touch surface of said wristband device sized for at least partly encircling a central wrist axis of a wearer's wrist, said at least one finger swipe is indicative of a data query;
    analyzing said at least one finger swipe on said wristband device to identify said data query;
    wirelessly transmitting said data query to a communication device;
    receiving at said wristband device, a response to said data query from said communication device,
    selecting one of a plurality of possible different haptic feedbacks on said wearer's wrist according to said response, each one of said plurality of possible different haptic feedbacks comprises instructions to operate at least some of a plurality of vibrating elements installed in said wristband device,
    operating at said wristband at least two of said plurality of vibrating elements to vibrate simultaneously with different intensities or different frequencies for providing said selected haptic feedback that comprises a predefined vibrating sequence induced by said at least two vibrating element.

20. The method of claim 19, further comprising receiving from a user instructions defining said data query and associating said at least one finger swipe with said data query.

21. The method of claim 19, wherein said data query is encoded in a message selected from a group consisting of: a missing call message, a voice mail message, a short message service (SMS), a multimedia messaging service (MMS), an instant messaging (IM) message, and an application notification.

22. The method of claim 19, wherein said method involves no viewing of said wristband structure.

* * * * *